United States Patent [19]

Malon

[11] Patent Number: 5,294,081
[45] Date of Patent: Mar. 15, 1994

[54] AUTOMATIC CONTROL SYSTEM FOR A RAILWAY VEHICLE'S SPEED AND STOPPING

[75] Inventor: Jean-Pierre Malon, Savignac Les Eglises, France

[73] Assignee: Aigle Azur Concept, Paris, France

[21] Appl. No.: 821,776

[22] Filed: Jan. 16, 1992

[30] Foreign Application Priority Data

Jan. 24, 1991 [FR] France ................. 91 00812

[51] Int. Cl.$^5$ ............................................. B61L 3/02
[52] U.S. Cl. ............................ 246/182 R; 246/187 B
[58] Field of Search .................... 246/28 R, 62, 122 R, 246/167 R, 180, 182 R, 182 A, 182 B, 182 C, 187 R, 187 B

[56] References Cited

U.S. PATENT DOCUMENTS

| | | | |
|---|---|---|---|
| 3,787,679 | 1/1974 | Birkin et al. | |
| 4,038,653 | 7/1977 | Brewster | 246/122 R X |
| 4,538,781 | 9/1985 | Birkin | 246/187 B |
| 4,655,421 | 4/1987 | Jaeger | 246/182 R X |
| 4,711,418 | 12/1987 | Aver, Jr. et al. | 246/187 B X |
| 4,723,737 | 2/1988 | Mimoun | 246/182 R X |
| 4,735,383 | 4/1988 | Corrie | 246/122 R X |
| 4,768,740 | 9/1988 | Corrie | 246/187 B X |
| 4,863,123 | 9/1989 | Bernard et al. | 246/122 R |
| 4,864,306 | 9/1989 | Wiita | 246/122 R X |
| 5,072,900 | 12/1991 | Malon | 246/187 B X |

FOREIGN PATENT DOCUMENTS

2126716 10/1972 France.
2139471 12/1972 France.
2542268 9/1984 France.
2661384 4/1990 France.

OTHER PUBLICATIONS

"Principes et fonctionnement du Systeme d'Aide a la Conduite, a l'Exploitation et a la Maintenance (SACEM)", Jean-Paul George, No. 6, Jun. 1990, Paris, France, pp. 23–28.

Primary Examiner—Frank E. Werner
Assistant Examiner—Scott L. Lowe
Attorney, Agent, or Firm—Wenderoth, Lind & Ponack

[57] ABSTRACT

A device comprises a detector for detecting markers along the railway track processor for processing the signals supplied by the detector, in order to control the speed of a rail vehicle as a function of its position and instantaneous speed on a track section. The markers comprise, on each track section, markers (1) arranged at constant or random intervals at the entry of each section and markers (2) arranged to form a beacon for identifying the section in question and for initializing the device. The signal processor comprises a memory (9) in which a vehicle progress program is stored in the form of codes associated with each marker arranged on the ground and each containing a data item relating to the type of ground marker which is to be detected, a data item relating to a set-point speed of the vehicle on a level with the marker, and a data item relating to the number of the track section covered.

5 Claims, 7 Drawing Sheets

AUTOMATIC CONTROL SYSTEM FOR A RAILWAY VEHICLE'S SPEED AND STOPPING

BACKGROUND OF THE INVENTION

The present invention relates to devices assisting the driving of rail vehicles.

French Patent No. 83 03 706 filed on Mar. 7, 1983 in the name of Mr Jean-Pierre Malon described a device for the driving and/or control of a rail vehicle, comprising means for dividing the route intended for the vehicle into successive space intervals, forming at least one program inscribed within the route, and means for detecting the limits of the space intervals, intended for controlling the means for the piloting and/or control of the vehicle.

The successive space intervals are delimited by markers arranged along the route, and take the form of codes identifying this at least one program, the detection means having at least one sensor for reading the codes and means for discriminating between the output signals of the sensor as a function of the operating conditions for the purpose of determining the program to be executed.

The known device of the abovementioned type ensures the safe movement of trains on an underground network.

The control of the train is ensured by the knowledge of two essential data items:

the state of occupation of the track downline from the moving vehicle in question (signalling); and the limiting possibilities of the track at the location of the moving vehicle (speed limit polygon).

In the device described in the abovementioned patent, there is transmission of the signalling state by means of carrier frequencies injected into the rails.

The markers arranged on the ground determine the speed profiles. They are read on board the train by on-board sensors.

Moreover, French Patent No. 90 05 285, filed on Apr. 25, 1990 in the name of ACELEC, makes known a device for automatic speed control which employs "retractable" markers when a plurality of program can be read.

In the two instances mentioned above, the control of the speed is obtained by a measurement of the running time between two successive markers.

Whatever the known control device to be used, the safety of the device is based on perfect detection of the ground markers.

In fact, an undetected marker allows, locally, an overspeed in relation to the speed which would be allowed in the event of normal detection of all the markers.

For example, a detection failure eliminating one marker out of two over a constant-speed zone allows a doubling of the maximum speed of the train.

In contrast, the inopportune detection of "phantom" markers is not detrimental to safety, since this detection of additional markers which do not actually exist, artificially decreases the maximum permitted speed.

It is therefore necessary to execute a safety validation of the detection of all the markers of each line, whether these markers are stationary or retractable.

SUMMARY OF THE INVENTION

The invention is aimed at overcoming the disadvantages of the devices with a program inscribed within a route by means of markers by providing a device that is considerably simplified in construction in relation to the abovementioned known devices, and the safety of which is considerably improved.

Its subject is, therefore, a device for the automatic control of speed and stopping, and for assisting the driving of vehicles, especially rail vehicles. A detector detects markers arranged along the railway track and a processor processes the signals supplied by the detector, in order to control the speed of the vehicle as a function of its position and instantaneous speed on a track section. The markers arranged along the track comprise, on each track section, markers arranged at constant or random intervals at the entry of each section, and markers arranged to form a beacon for identifying the section in question and for initializing the device. The processor processing the signals supplied by the detector comprises a memory in which the vehicle progress program is stored in the form of codes associated with each marker arranged on the ground and each containing a data item relating to the type of ground marker which is to be detected, a data item relating to the set-point speed of the vehicle on a level with the marker, and a data item relating to the number of the track section covered, a safety-window coherence portion intended for ensuring that the signals relating to the markers detected on the ground and the signals coming from the memory storing the vehicle progress program relating to the same marker are contained in a spatial window of predetermined value, and an overspeed chain intended for commanding the emergency braking of the vehicle if the signals are separated by a distance greater than the spatial window.

BRIEF DESCRIPTION OF THE DRAWINGS

The invention will be understood better from the following description, given purely by way of example, and made with reference to the accompanying drawings, in which.

DETAILED DESCRIPTION OF THE PREFERRED EMBODIMENT

To guarantee the detection of the ground markers, the device according to the invention makes use of a description of the position of all the markers of a route in the memory of a computer located on board the train.

A space sensor connected to the train makes it possible to advance the memory in order to generate a dummy marker.

The initialization of such a description is obtained by means of a beacon for identifying the track section which the train enters. A spatial window coincidence system ensures the validation of the detection of the ground marker in relation to the stored dummy marker.

Figure 1:
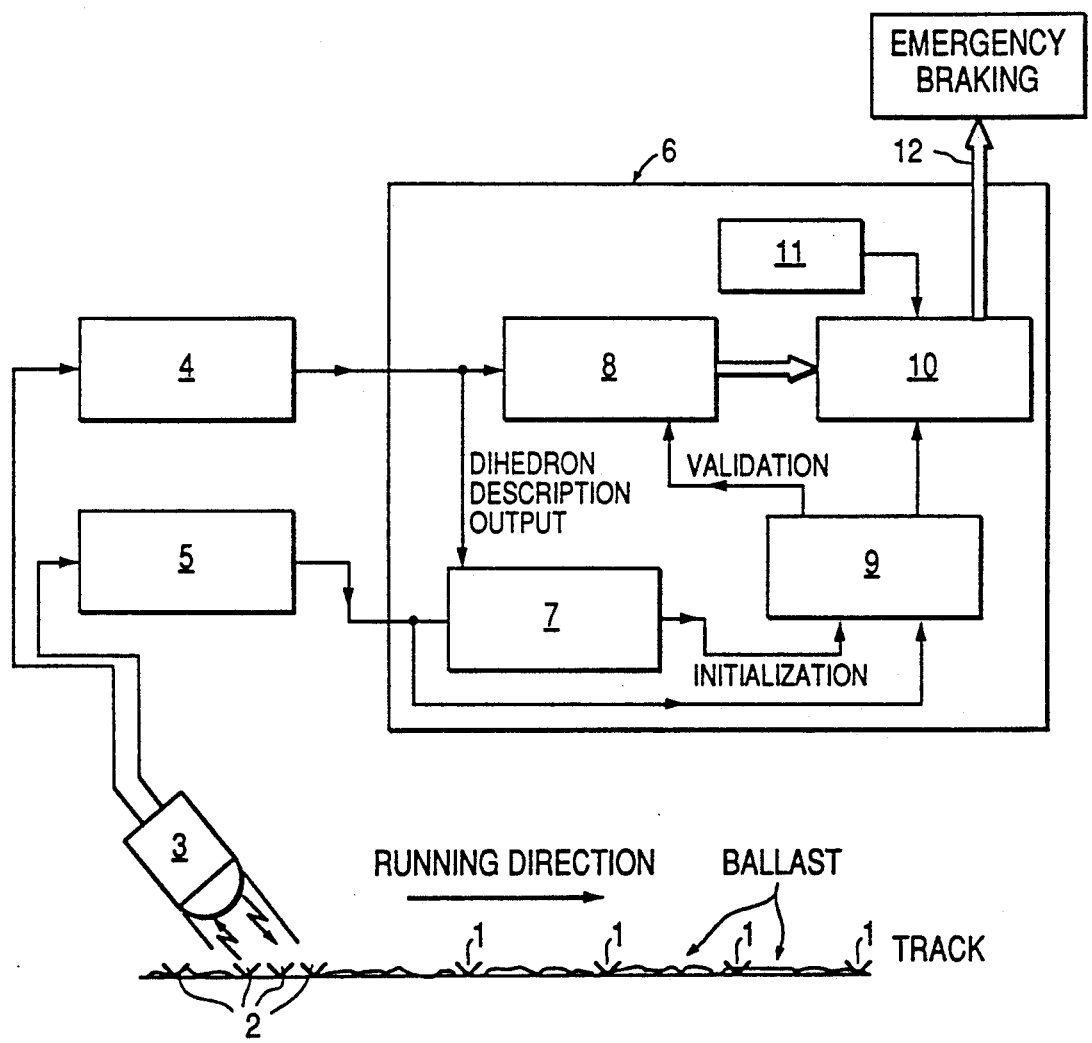
FIG. 1 is a block diagram of the architecture of a control and driving-assistance device according to the invention.

The device illustrated in FIG. 1 is associated with a track on which are placed stationary markers in the form of dihedra 1 arranged on the track at regular intervals.

Markers 2 arranged at the entry of each track section according to a specific configuration form an initializing beacon.

The actual device comprises a Doppler radar 3 for detecting the markers 1 and 2, carried by a train, pointed towards the track ballast and directed towards the markers.

The radar 3 comprises a first output connected to a circuit 4 for detecting the markers or dihedra 1 and 2 and a second output connected to a circuit 5 for detecting the space covered.

These two circuits are themselves connected to a safety computer 6, which contains a circuit 7 for the recognition of an initializing beacon that has a first input connected to the output of the beacon-detection circuit 5 and a second input connected to the output of the dihedra-detection circuit 4.

The computer 6 comprises, furthermore, a safety-window coherence circuit 8, of which one input is connected to the output of the dihedra-detection circuit 4 and of which a second input is connected to one output of a memory 9 containing the layout description of the markers or dihedra corresponding to the route which the corresponding train has to follow and to the speed which it must maintain.

The memory a comprises, furthermore, an input connected to the beacon recognition circuit 7 and an input connected to the output of the space-detection circuit 5.

The safety-window coherence circuit 8 is connected to an overspeed chain 10, one input of which is also connected to the memory 9 and another input of which is connected to a time-based circuit 11.

The output of the overspeed chain 10 is connected to a line 12 for connection to emergency braking means (not shown).

The markers or dihedra 1 and 2 based on the ground have two functions:
  initialization of the position of the train by beacon; and
  safety location of the train on the track section which it is covering by the identification of its run, with the description of the latter stored in the memory 9.

Figure 2:
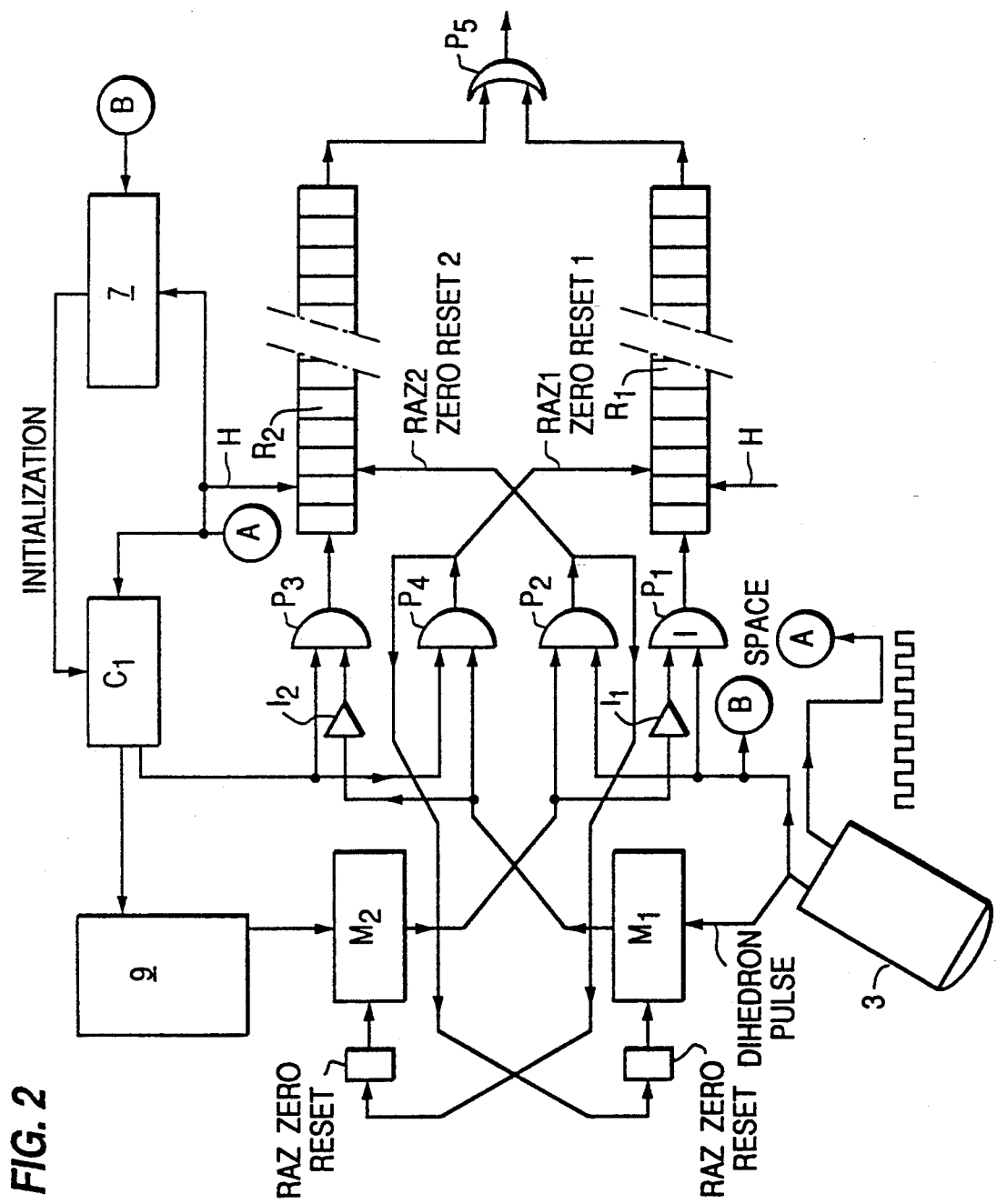
FIG. 2 is a more detailed electrical diagram of the device in FIG. 1.

The diagram of FIG. 2 comprises the Doppler radar, one output of which is connected to a buffer memory M1 for the storage of signals occurring as a result of the detection of markers.

The memory 9 describing the layout of the markers is connected to a buffer memory M2.

The memories M1 and M2 are connected to zero-reset means RAZ.

The abovementioned output of the radar 3 is connected to one input of an AND gate P1, another input of which is connected by means of an inverter I1 to the output of the memory M2.

The output of the gate P1 is connected to the input of a shift register R1, which comprises a clock input H and a zero-reset input RAZ1.

The output of the memory M2 is connected to one input of a second AND gate P2, another input of which is connected to the marker-detection output of the radar 3.

The output of the memory M1 is connected to one input of a third AND gate P3 by means of an inverter I2 and to one input of a fourth AND gate P4.

The other inputs of the gates P3 and P4 are connected to the output of an address counter C1, which is likewise connected to an input of the layout description memory 9.

The output of the AND gate P3 is connected to the input of a second shift register R2, which comprises a clock input H and a zero-reset input RAZ2.

The output of the AND gate P2 is connected to the zero-reset input RAZ2 of the register R2.

The output of the AND gate P4 is connected to the zero-reset input RAZ1 of the register R1.

Finally, the device comprises the identification-beacon recognition circuit 7 which is controlled by the same clock signals as the shift registers R1 and R2 and the address counter C1 and the input of which is connected to the space-covered output of the radar 3.

The circuit 7 is connected by means of its output to the address counter C1.

The outputs of the shift registers R1 and R2 are connected to the inputs of an OR gate P5, which supplies an emergency-braking control signal.

Figure 3:
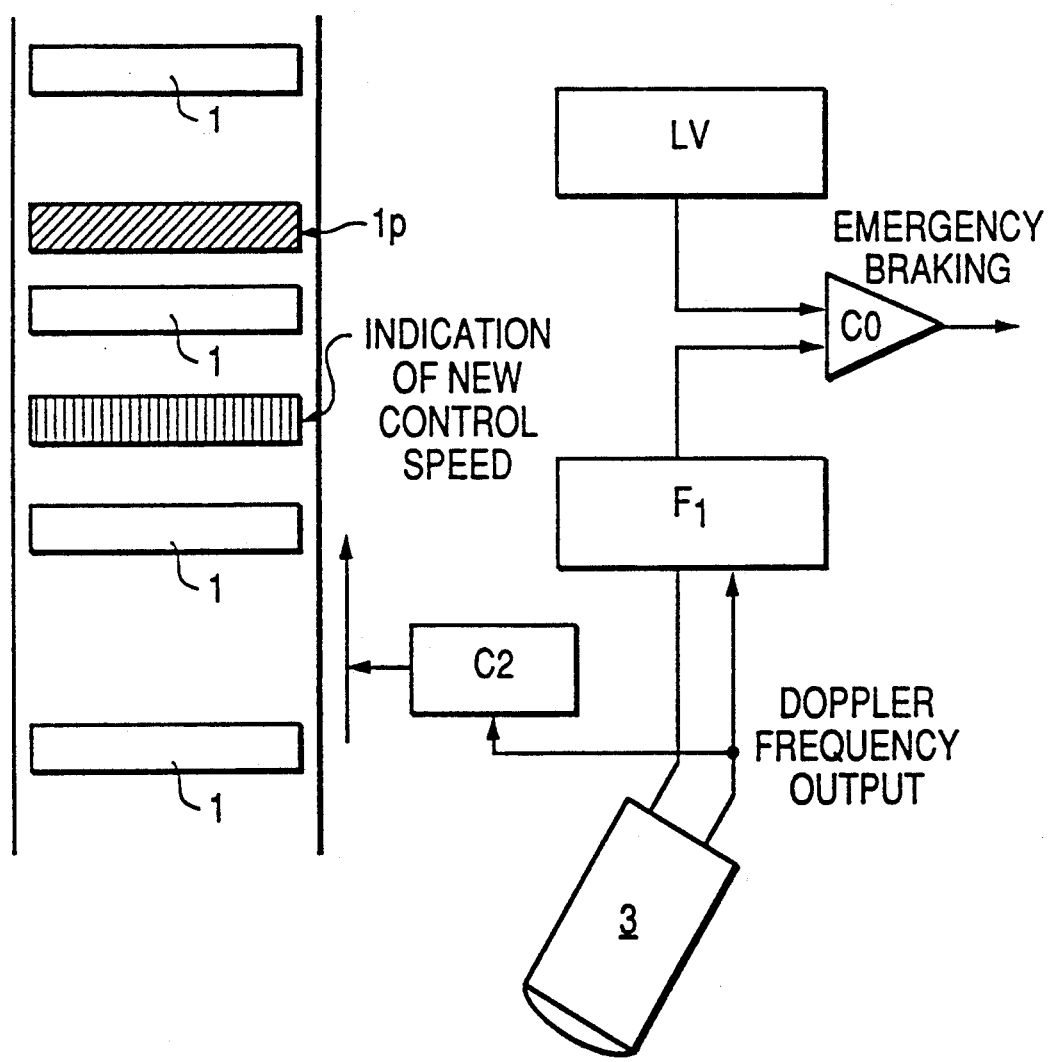
FIG. 3 is an electrical diagram of the speed-control circuit of the device of the invention.

The speed-control circuit illustrated in FIG. 3 comprises an address counter C2 connected to the covered-space output of the radar 3. This output is also connected to a frequency meter F1 for measuring the actual speed.

The output of the frequency meter F1 is connected to one input of a comparator CO, another input of which is connected to a circuit LV for reading the stored set-point speed.

The output of the comparator CO is intended to act on emergency braking means (not shown).

The code stored in the layout description memory 9 comprises, for example, 8 set-point speed coding bits and 2 message-type coding bits, for example:
  00 indicates a marker
  01 indicates a spurious marker
  10 indicates the set-point speed
and 6 track-section number coding bits.

As regards the radar 3, it sees the position of the markers 1 and the position of a spurious marker 1p, as indicated in FIG. 3.

On the basis of this situation, the indication of a new set-point speed is obtained.

The coherence chain described with reference to FIG. 3 functions as follows.

The coherence system receives at one input the information coming from the Doppler radar 3.

This sensor supplies, on the one hand, pulses detecting the markers or dihedra 1 and 2 placed on the ground and, on the other hand, a signal representing the space covered, these signals being applied respectively to the detection circuits 4 and 5.

At the same time, pulses relating to the markers described are read in the memory 9 under the control of the space-covered signals.

The addressing of this reading is initialized as a result of the recognition of the identification beacon formed from the markers 2 at the beginning of the track section in question. The address counter C1 subsequently advances at the rate of movement of the train by means of the space output of the Doppler radar 3.

The coherence circuit is symmetrical.

It checks that, when a pulse is present at one of the inputs, an associated pulse must arrive at the other input within a spatial window of specific value, for example of 20 cm.

Should a ground marker be detected, the pulse is:
on the one hand applied to the memory M1; and
on the other hand applied to the input of the AND gate P1.

The AND gate receives the inverted output from the memory M2 on its other input.

Two situations can arise:
the ground dihedron or marker is the first to be detected, or
a stored dihedron has already been detected.

In the first situation, the dihedron or marker detected is stored in the memory M1.

The pulse is also transmitted to the shift register R1 which advances at the rate of the space clock.

The pulse is transmitted by means of the AND gate P1, because its other input is in the state 1 since the memory M2 is empty.

If no RAZ signal is applied to the shift register R1, the input pulse will leave at the end of N clock pulses and apply emergency braking by means of the OR gate P5.

In the second situation, the pulse is applied to one input of an AND gate P2, the input of which receives the signal from the memory M2.

The output of the AND gate P2 serves to zero-reset the shift register R2 and also the memory M2 after a time delay.

The length of the spatial window is a function of the number of bits of the shift register.

If the Doppler radar 3 generates a pulse every 2 cm, for a window length of 20 cm, the shift register has ten cells or bits.

The functioning of the overspeed control in the event of a constant-interval marker layout is as follows.

The speed-control circuit illustrated in FIG. 3 reads the set-point speeds in the memory as a function of the progress of the train on the track section.

The advance within the memory 9 is subjected to a safety check by the coherence circuit (FIG. 2).

The space output of the radar 3 is connected to the frequency meter F1 which indicates the quasi-instantaneous speed of the train.

This speed is applied in digital form to the comparator CO which on its other input receives the set-point speed stored at the relevant point in the memory 9 and read by the reading circuit LV.

The output of the comparator acts on the emergency braking if V actual > V nominal.

If the "spurious" markers 1p detected on the ground are of sufficient number and are distributed uniformly along the track, it is possible to omit some or even all the constant-interval markers.

The description memory 9 then contains only the positions of these spurious markers.

The functioning of the device according to the invention will be examined with reference to the flow diagrams of FIGS. 4 to 7.

Figure 4:
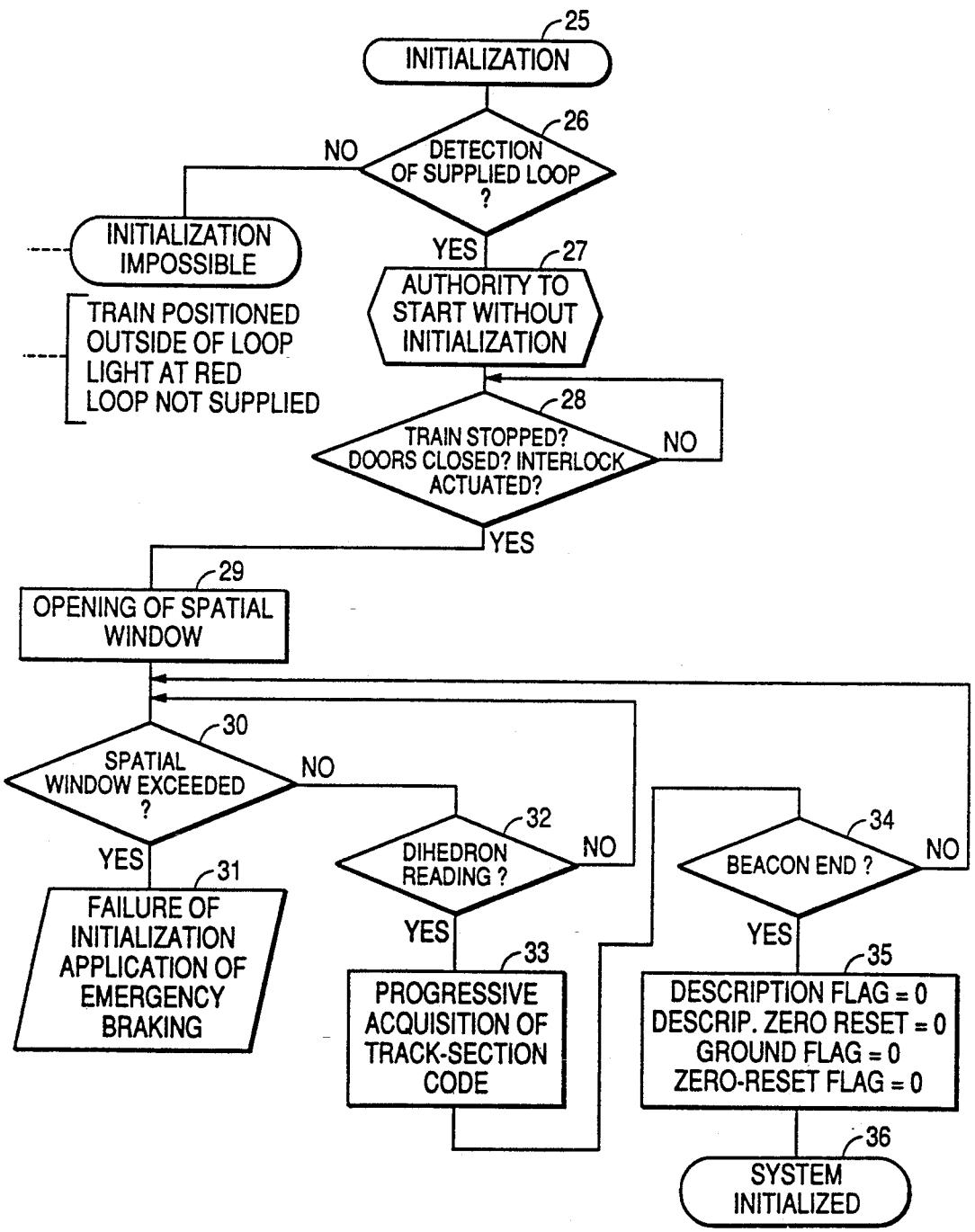
FIG. 4 is a coherence flow diagram for the initialization of the device in FIG. 1.

As shown in FIG. 4, the initialization of the system is ensured during the phase 25. It is followed immediately by the question of whether there is the detection of a supplied loop during the phase 26.

If no supplied loop is detected, initialization is impossible, and this means that:
the train is positioned outside the loop in question;
a corresponding signal light is at red; or
the loop in question is not fed.

If the answer is in the affirmative, there is authority to start without initialization during a phase 27.

Authority to start being given, it is determined during the phase 28 whether the train is stopped, whether the doors of the train are closed and whether the interlock is actuated.

In the negative, phase 28 is begun again.

In the affirmative, there is a pass to the phase 29 for opening a spatial window, the width of which determines the precision with which the programs stored in the memory are in phase with the dihedrons on the ground.

During phase 30, the possible exceeding of the spatial window is determined.

If this is so, during phase 31 the failure of initialization is ascertained and the emergency braking is applied.

If the spatial window is not exceeded, there is a pass to a phase 32 for checking the reading of the markers or dihedra.

If the markers are not read, there is a return to the phase 30 for determining the exceeding of the spatial window.

If the markers are read, there is a pass to phase 33 for the progressive acquisition of the track-section code.

Subsequently, the beacon end is determined during phase 34.

If the beacon is not exceeded, there is a return to the phase 30 for determining the exceeding of the spatial window.

If the beacon is exceeded, the following flag situation is ascertained during phase 35:
description flag = 0
description zero-reset flag = 0
ground flag = 0
ground zero-reset flag = 0

This means that the route program inscribed in the memory 9 (FIG. 1) and the means for reading the ground markers are in their initial state.

During phase 36, it is indicated that the system is initialized.

Figure 5:
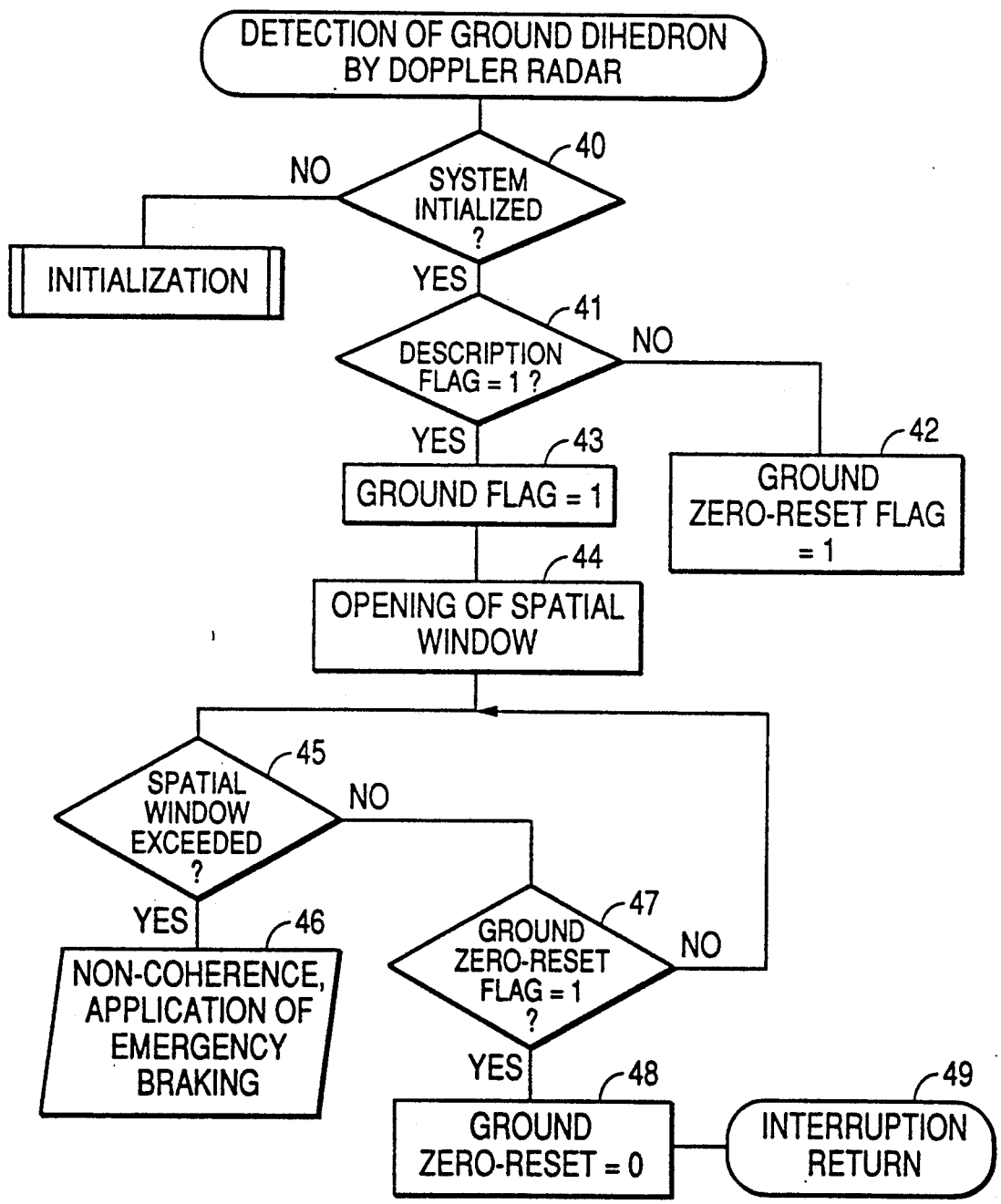
FIG. 5 is a coherence flow diagram for the detection of the device in FIG. 1.

There is a subsequent pass, according to the flow diagram of FIG. 5, to the operations for detecting markers or dihedra 1.

In order to detect a ground marker by means of the Doppler radar 3, phase 40 makes sure that the system is initialized.

In the negative, there is a return to the initialization operations described with reference to FIG. 4.

In the affirmative, there is a pass to the phase 41 for examining the description flag.

If the description flag is not equal to 1, the ground zero-reset flag is equal to 1, as indicated in phase 42.

If the description flag is equal to 1, the ground flag is equal to 1, as is ascertained in phase 43, and there is a pass to the phase 44 for opening a spatial window.

If it is ascertained during phase 45 that the spatial window is exceeded, non-coherence is ascertained and the emergency braking is applied during phase 46.

If the spatial window is not exceeded, it is determined during phase 47 whether the ground zero-reset flag = 1.

If not, there is a return to phase 45 for determining the exceeding of the spatial window.

If so, there is a pass to the phase 4 for ground zero-reset RAZ = 0 and then to the interruption return phase 49.

Figure 6:
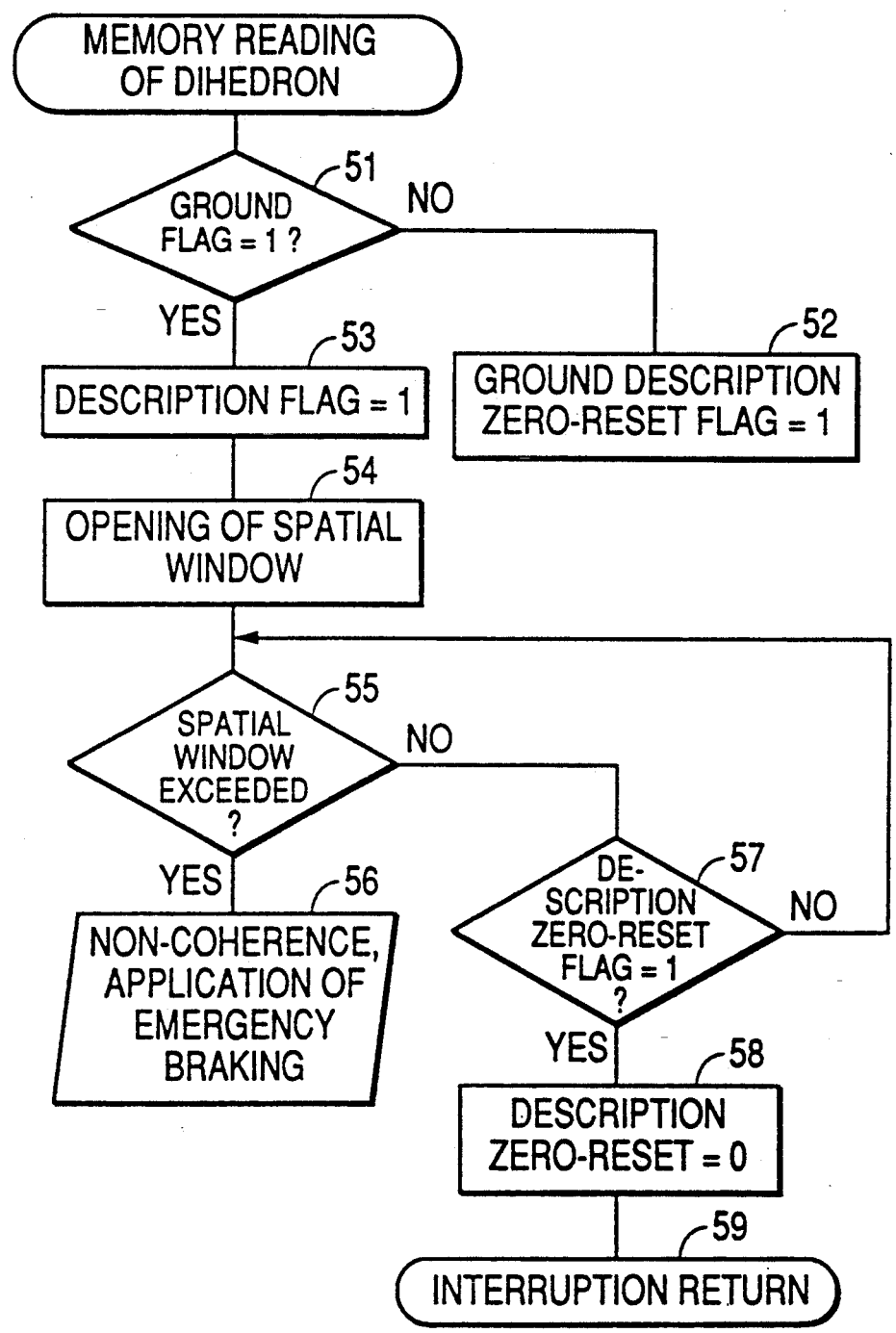
FIG. 6 is a coherence flow diagram for reading the memory of the device in FIG. 1.

The reading of a marker or dihedron in the memory 9 (FIG. 1) will now be described with reference to the flow diagram of FIG. 6.

During phase 51, it is ascertained that the ground flag=1.

If the ground flag≠1 in phase 51, the ground description zero-reset flag=1 as indicated in phase 52.

If so, the description flag=1, as indicated by phase 53, and during phase 54 the opening of a spatial window is initiated.

If it is ascertained during phase 55 that the spatial window is exceeded, there is non-coherence and application of the emergency braking during phase 56.

If the spatial window is not exceeded, the state of the description zero-reset flag is determined during phase 57.

If the description zero-reset flag is not equal to 1, there is a return to the phase 55 for determining the state of exceeding of the spatial window.

If the description zero-reset flag=1, the zero-reset of the description passes to 0, as indicated by phase 58, and there is a return of interruption during phase 59.

Figure 7:
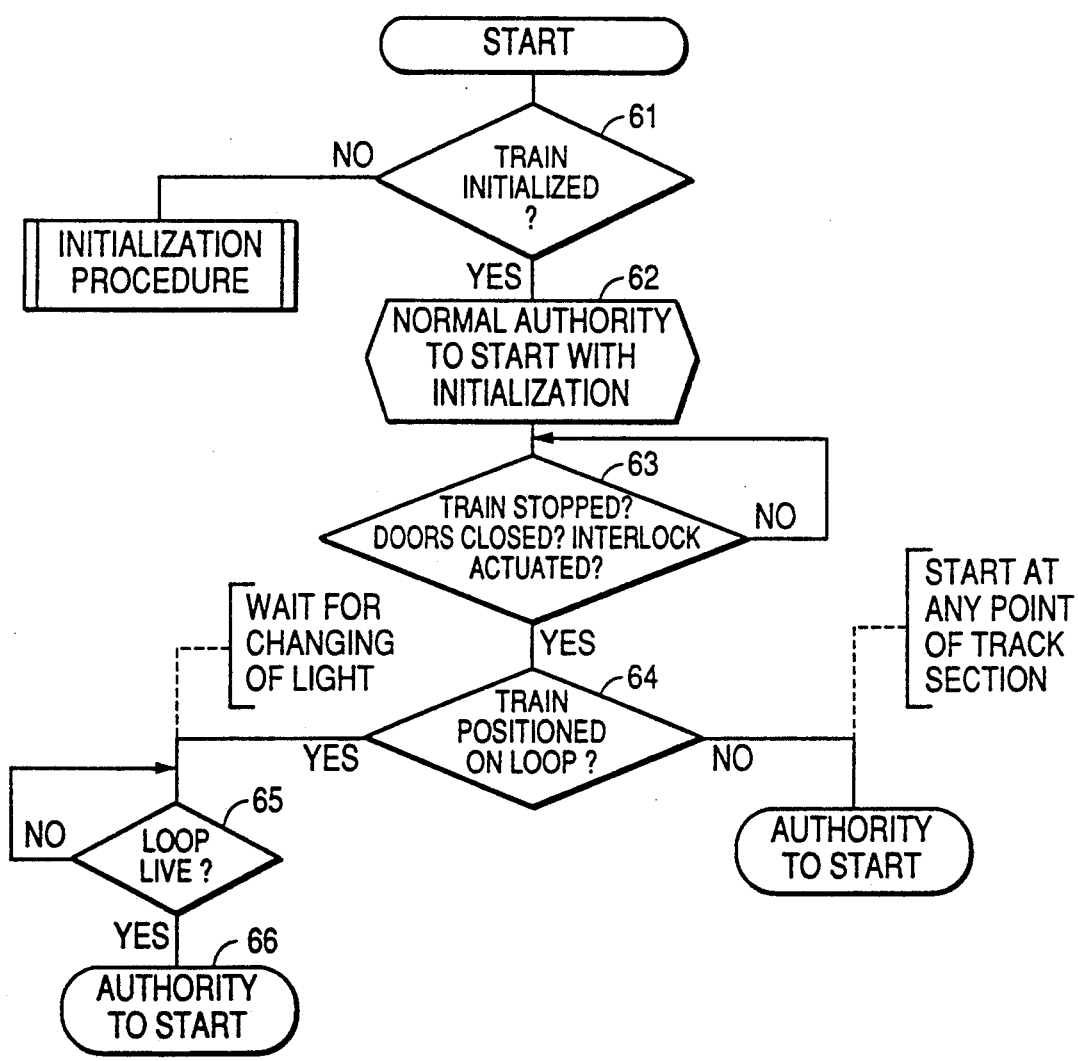
FIG. 7 is a flow diagram for the starting procedure.

The starting of the train will be described with reference to the flow diagram of FIG. 7.

It is first ensured during phase 61 that the train is initialized.

In the negative, there is a return to the initialization described with reference to FIG. 4.

In the affirmative, the procedure during phase 62 is for a normal authority to start with initialization.

The state of the train is determined during phase 63.

If the train is stopped, with the doors closed and the interlock actuated, there is a pass to the phase 64 for determining the positioning of the train on the loop.

If not, there is a return to the phase 63 for determining the state of the train.

If the train is positioned, a check is made during phase 65 that the loop is supplied.

In the affirmative, there is authority to start during phase 66.

In the negative, phase 65 is resumed.

At the same time, if appropriate there is a wait for the changing of the light preventing the start.

If the train is not positioned on the loop, there is authority to start during phase 66, since the start can take place at any point of the track section.

The coherence system just described also controls the accuracy and drift of the space sensor, since any variation of the space measured generates a loss of synchronization.

This coherence system makes it possible to guarantee the position of the train on the track accurately and safely at each new marker detected.

However, the permitted speed limit is still represented by the distance between two consecutive markers.

The use of a computer and of a description memory makes it possible to install the speed-control program on board the train.

The markers placed on the ground are then arranged at fixed intervals, as are the dummy markers described in the memory.

The additional markers ensuring the speed control are described only in the memory, interposed between the dummy markers and given a special reference so that they are not taken into account by the coherence system.

The system according to the invention has an increased flexibility in comparison with the known systems, since it makes it possible to modify the speed control without any action on the speed markers stored in the memory 9 (FIG. 1).

It is therefore possible to run on the same track trains which have different characteristics and consequently different laws of speed control.

The space between two ground markers defines the "dormant" time of the system.

The accuracy of the position of the train and therefore the accuracy of the speed control depend on the distance between two consecutive markers.

I claim:

1. A device for automatic control of a railway vehicle, comprising:
    a detection means to be carried onboard the railway vehicle for detecting markers along a railway track; and
    processing means for processing signals supplied from said detection means for controlling the speed of the railway vehicle as a function of the railway vehicle's position and instantaneous speed on a track section of the railway track;
    wherein the markers on a said track section comprise markers arranged at intervals at an entry portion of said track section and markers arranged to define a beacon that identifies said section; and
    wherein said processing means comprises a memory storing a vehicle progress program in the form of codes associated with each said marker along the railway track, each code containing a data item relating to the type of said marker, a data item relating to a set-point speed for the railway vehicle at said marker and a data item relating an identifier number of said track section, coherence means for determining whether signals supplied from said detection means to said processing means relating to markers detected along the railway track and data items form said memory storing the vehicle progress program are contained in a spatial window of a predetermined value, and an overspeed device for commanding emergency braking of the railway vehicle if said coherence means determines that said signals from said detection means and said data items from said memory are not within said spatial window.

2. The device according to claim 1, wherein said coherence means comprises a symmetrical circuit for processing said signals coming from said detection means and said data items from said memory storing the vehicle progress program comprising, for said signals from said detection means, a first buffer memory connected to an output of said detection means, said output also being connected to a first AND gate, said first AND gate having another input for receiving a data item relating to the simultaneous presence of a data item from said memory storing the vehicle progress program, and said first AND gate having an output which is connected to an input of a first shift register for defining a spatial window for said signals, a second AND gate receiving at one input said signals from said detection means and at another input a data item relating to the presence of said data item from said memory storing the vehicle progress program, an output of said second AND gate being connected to a zero-reset input of a second shift register for defining a window for said data items from said memory storing the vehicle progress program and to a zero-reset input of a second buffer memory for said data-items from said memory storing the vehicle progress program, said second buffer memory being connected to one input of each of said first and second AND gates, a third AND gate, one input of which is connected to an output of said first buffer memory and a second input of which is connected to an output of an address counter controlling access to said memory storing the vehicle progress program, said third AND gate having an output of which is connected to an input said second shift register for defining a spatial window for dummy marker signals from said memory storing the vehicle progress program, and a fourth AND gate, one input of which is connected to said output of said first buffer memory, another input of which is connected to said output of said address counter, and an output which is connected to a zero-reset input of said first buffer memory, wherein an output of said first shift register is connected to one input of an OR gate and an output of said second shift register is connected to another input of said OR gate, said OR gate supplying emergency braking control signals for said overspeed device.

3. The device according to claim 1, wherein said overspeed device comprises a frequency meter connected to an output of said detection means, a device for reading the set-point speed stored in said memory storing the vehicle progress program, and a digital comparator comparing output signals of said frequency meter and said reading device, supplying at its output an emergency braking control signal when the speed detected by said detection means is higher than the set-point speed.

4. The device according to one of claims 1 to 3, wherein said memory storing the vehicle progress program contains codes corresponding to dummy markers for indicating new control speeds for modifying the speed of the railway vehicle at specific points along the railway track, reading of said dummy markers being controlled by covered space signals from said detection means.

5. The device according to one of claims 1 to 3, wherein said memory storing the vehicle progress program contains codes corresponding to spurious markers which said detection means is prompted to detect during movement of the railway vehicle.

* * * * *